(12) United States Patent  
Berger et al.

(10) Patent No.: US 12,020,273 B2  
(45) Date of Patent: *Jun. 25, 2024

(54) CAMPAIGN DRIVEN OFFER DISTRIBUTION SYSTEM

(71) Applicant: PAYPAL, INC., San Jose, CA (US)

(72) Inventors: Alexander Berger, San Jose, CA (US); Manas Garg, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/126,984

(22) Filed: Mar. 27, 2023

(65) Prior Publication Data

US 2023/0237519 A1 Jul. 27, 2023

Related U.S. Application Data

(63) Continuation of application No. 17/140,650, filed on Jan. 4, 2021, now Pat. No. 11,625,740, which is a (Continued)

(51) Int. Cl.
```
G06Q 30/00      (2023.01)
G06Q 30/0207    (2023.01)
G06Q 30/0241    (2023.01)
```

(52) U.S. Cl.  
CPC ..... G06Q 30/0207 (2013.01); G06Q 30/0276 (2013.01)

(58) Field of Classification Search  
CPC ................ G06Q 30/0207; G06Q 30/0276  
See application file for complete search history.

(56) References Cited

U.S. PATENT DOCUMENTS

| | | | |
|---|---|---|---|
| 11,070,890 B2* | 7/2021 | Carney | H04N 21/8545 |
| 2001/0032128 A1* | 10/2001 | Kepecs | G06Q 30/02 705/14.4 |

(Continued)

OTHER PUBLICATIONS

S. Li, X. -L. Li, W. L. Tung and K. Sim, "Behaviors and Profit Based Sales Campaign Design," 2015 IEEE 27th International Conference on Tools with Artificial Intelligence (ICTAI), Vietri sul Mare, Italy, 2015, pp. 353-360, doi: 10.1109/ICTAI.2015.61. (Year: 2015).*

(Continued)

*Primary Examiner* — Sun M Li  
(74) *Attorney, Agent, or Firm* — Haynes and Boone, LLP; Eric Li

(57) ABSTRACT

Systems and methods for providing campaign driven offer distribution include receiving, from a service provider device associated with a service provider, first campaign information for a first campaign. A first offer that has been configured to be irredeemable by the first customer and that includes a first offer condition associated with the first campaign information that must be satisfied to reconfigure the first offer to be redeemable by the first customer is provided for display on a first customer device. A notification indicating the first offer condition has been satisfied is received. In response to receiving the notification indicating the first offer condition has been satisfied, the first offer is reconfigured to be redeemable by the first customer. A notification indicating a status change with the first offer that causes the first offer to be displayed on the first customer device is communicated to the first customer device.

20 Claims, 17 Drawing Sheets

Related U.S. Application Data continuation of application No. 15/085,406, filed on Mar. 30, 2016, now Pat. No. 10,885,540.

(56) References Cited

U.S. PATENT DOCUMENTS

| | | | |
|---|---|---|---|
| 2009/0006183 A1* | 1/2009 | Paintin | G06Q 30/0273 705/7.29 |
| 2012/0221401 A1 | 8/2012 | Brown et al. | |
| 2014/0122202 A1* | 5/2014 | Shugart | G06Q 30/02 705/14.23 |
| 2015/0120411 A1 | 4/2015 | Kneen | |
| 2019/0005528 A1* | 1/2019 | Freed-Finnegan | G06Q 20/387 |

OTHER PUBLICATIONS

P. Blenkhorn, G. Evans, A. King, S. Hastuti Kurniawan and A. Sutcliffe, "Screen magnifiers: evolution and evaluation," in IEEE Computer Graphics and Applications, vol. 23, No. 5, pp. 54-61, Sep.-Oct. 2003, doi: 10.1109/MCG.2003.1231178. (Year: 2003).*

S. Li, X. -L. Li, W. L. Tung and K. Sim, "Behaviors and Profit Based Sales Campaign Design," 2015 IEEE 27th International Conference on Tools with Artificial Intelligence (ICTAI), 2015, pp. 353-360, doi: 10.1109/ICTAI.2015.61. (Year: 2015) (Year: 2015).*

M. Cheung, "Factors Affecting the Design of Electronic Direct Mail Messages: Implications for Professional Communicators," in IEEE Transactions on Professional Communication, vol. 54, No. 3, pp. 279-298, Sep. 2011, doi: 10.1109/TPC.2011.2161800. (Year : 2011).*

Li S., et al., "Behaviors and Profit Based Sales Campaign Design," 2015 IEEE 27th International Conference on Tools with Artificial Intelligence (ICTAI), Jan. 7, 2015, pp. 353-360.

U.S. Appl. No. 14/985,551, Narasimhan S. et al., "Purchase Abandonment Conversion System", filed Dec. 31, 2015, 53 pages.

Yan L., et al., "Predicting Customer Behavior in Telecommunications," IEEE Intelligent Systems, Mar.-Apr. 2004, vol. 19, No. 2, pp. 50-58.

* cited by examiner

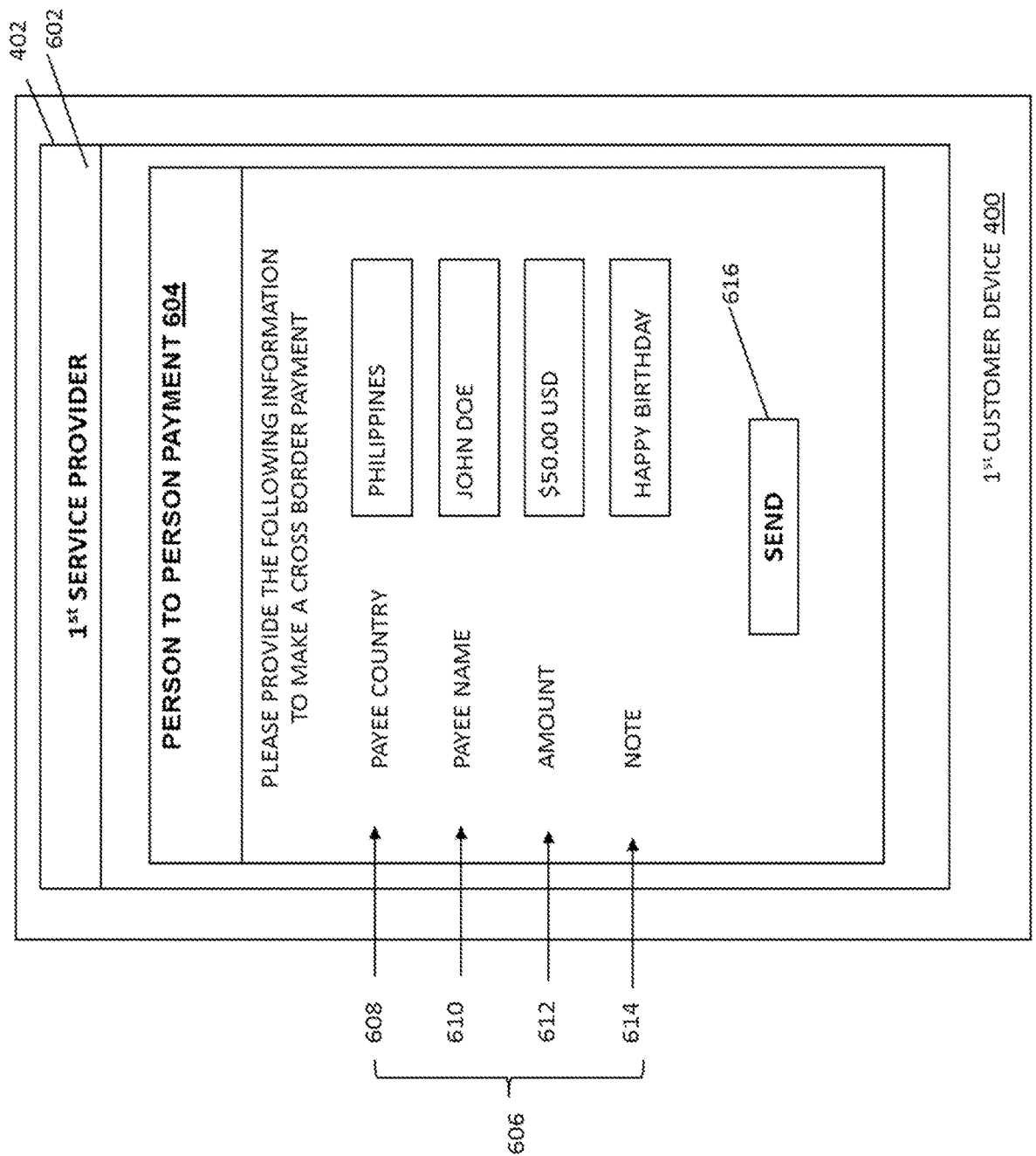

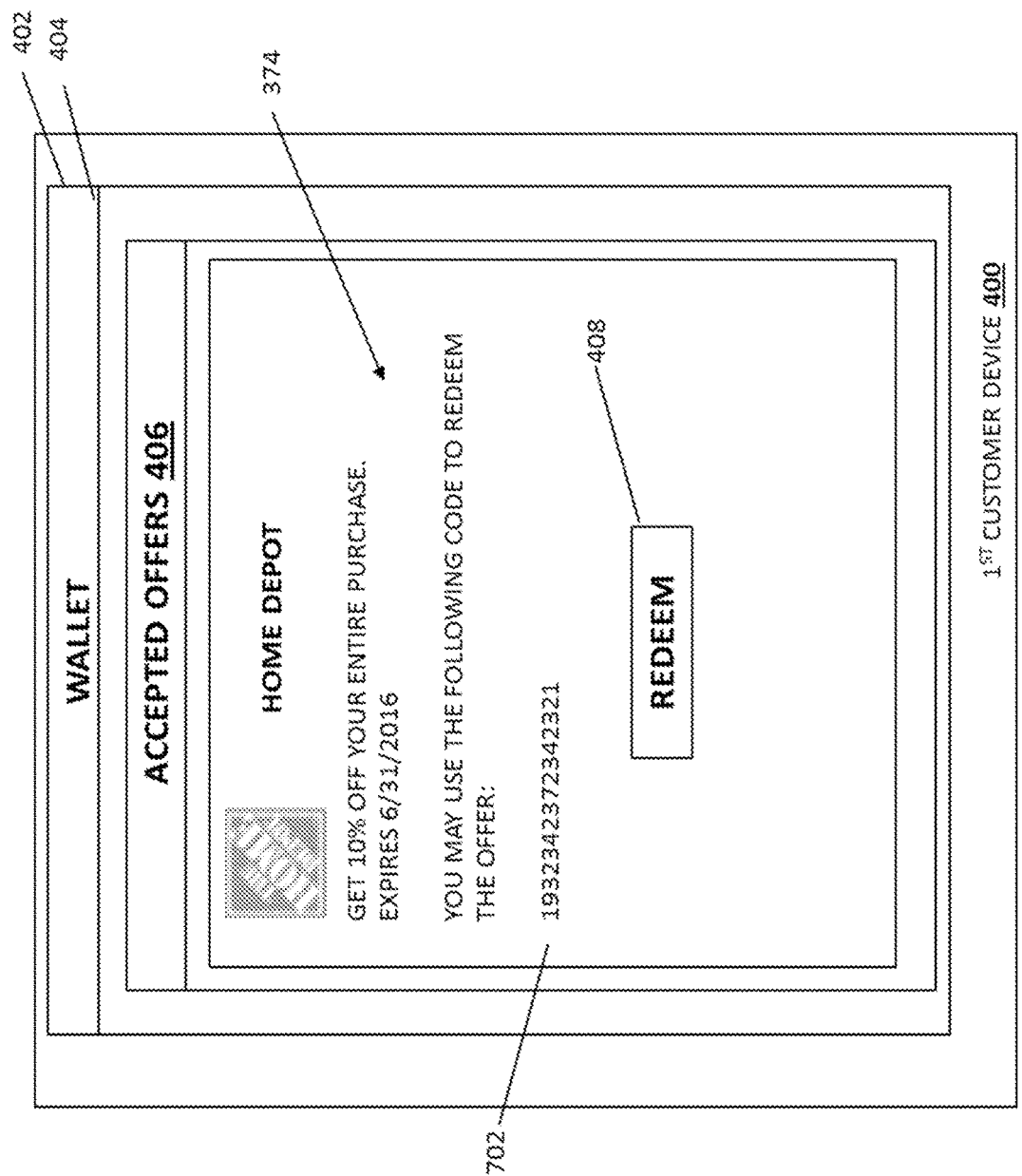

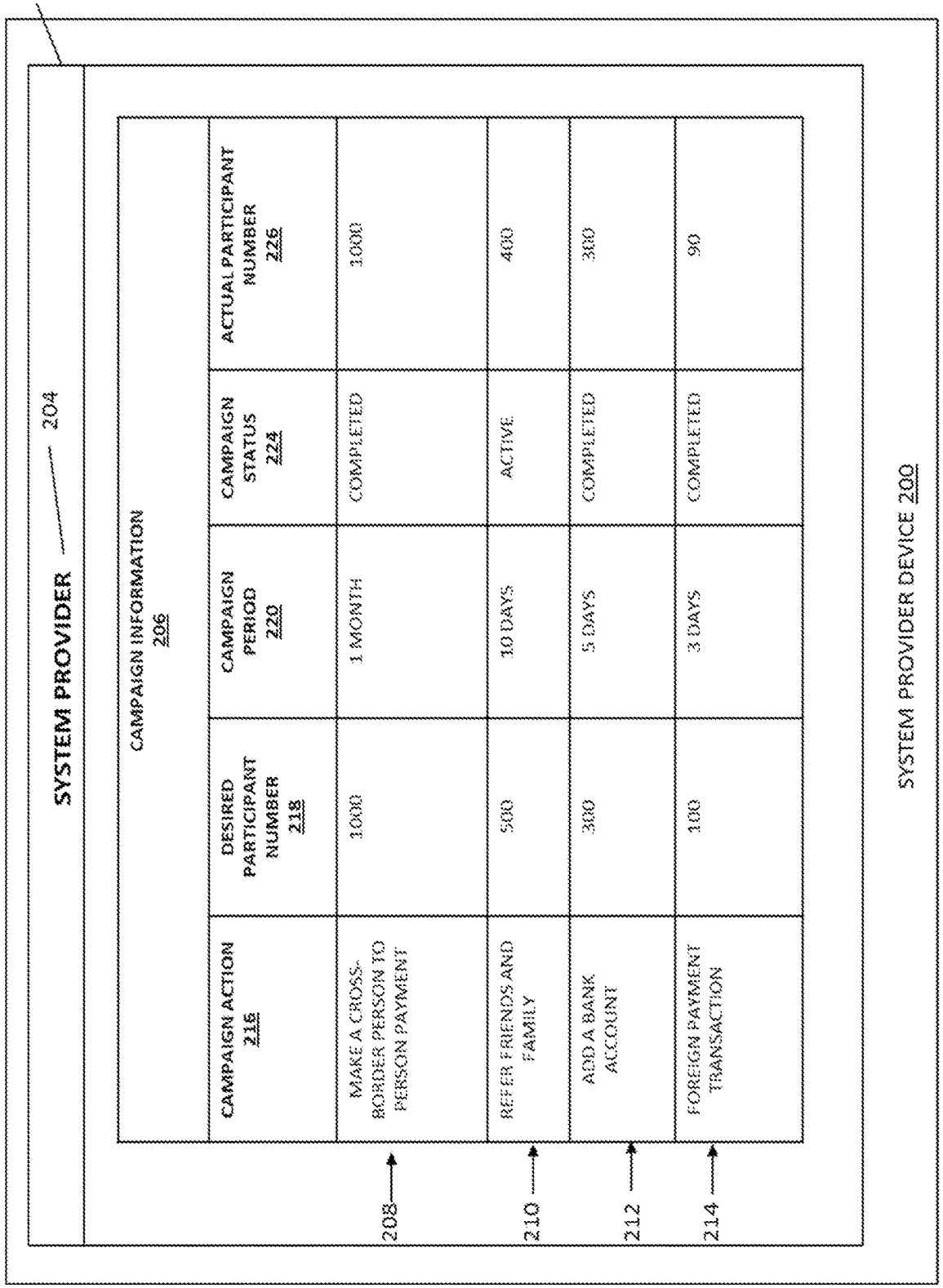

CAMPAIGN DRIVEN OFFER DISTRIBUTION SYSTEM

CROSS REFERENCED TO RELATED APPLICATIONS

This application claims priority to and is a continuation of U.S. patent application Ser. No. 17/140,650, filed Jan. 4, 2021, which is a continuation of Ser. No. 15/085,406, filed on Mar. 30, 2016, the contents of which are incorporated herein by reference in its entirety.

BACKGROUND

The present disclosure generally relates to offer distributions conducted over electronic networks and more particularly to campaign driven offer distribution systems for system providers to provide merchant offers to customers to incentivize the customers to perform campaign actions.

More and more consumers are conducting transactions, such as purchasing items and services, over electronic networks such as, for example, the Internet. Consumers routinely purchase products and services from merchants and individuals alike. The transactions may take place directly between a physical or on-line merchant or retailer and the consumer, and payment is typically made by entering credit card or other financial information. Transactions may also take place with the aid of an on-line or mobile payment service provider such as, for example, PayPal, Inc. of San Jose, CA. Such payment service providers can make transactions easier and safer for the parties involved. Purchasing with the assistance of a payment service provider from the convenience of virtually anywhere using a mobile device is one main reason why on-line and mobile purchases are growing very quickly.

Service providers may run campaigns to increase customer engagement with their products by, for example, using some specific features or products (e.g., foreign payment transactions, person-to-person payments) provided by those service providers. On the other hand, a merchant may provide its customers various merchant offers, including a discount offer (e.g., an offer to discount an amount off the price of a purchase), a free shipping offer (e.g., offering free shipping for a purchase), a credit offer (e.g., an offer to provide a credit that is redeemable with the merchant in response to a purchase, an offer to finance an amount of the price of the purchase), and/or a variety of other offers (e.g., seasonal offers, clearance sales), and customers may be incentivized by that offer to make the online and/or mobile purchase. While a system provider may distribute merchant offers together with campaign materials for the campaigns, such usage of merchant offers usually does not guarantee that particular campaign goals will be met.

Thus, there is a need for a campaign driven offer distribution system.

BRIEF DESCRIPTION OF THE FIGURES

FIG. 6 is a screen shot illustrating an embodiment of a first customer device displaying a campaign action screen;

FIG. 7 is a screen shot illustrating an embodiment of a first customer device displaying an accepted offers screen;

FIG. 8B is a screen shot illustrating an embodiment of a system provider device displaying a campaign information screen;

Figure 1:
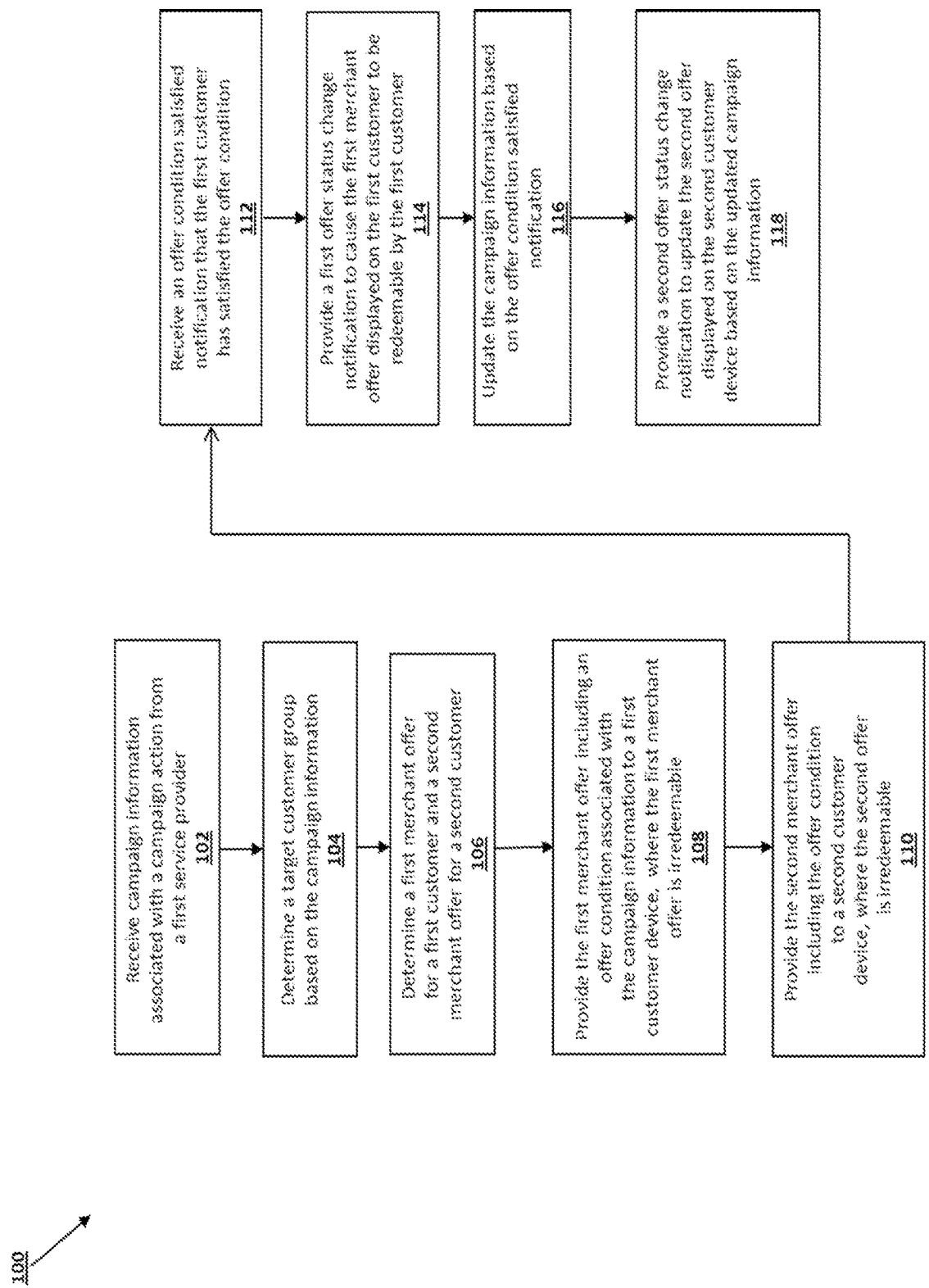
FIG. 1 is a flow chart illustrating an embodiment of a method for providing campaign driven offer distribution.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for distributing campaign driven offers to customers. As discussed above, a system provider may distribute merchant offers together with campaign materials to incentivize those customers to participate in the campaign, but the conventional provision of such offers does not guarantee that the campaign goal of increasing the customer engagement with the campaigned product will be met. However, in embodiments of the systems and methods described herein, a system provider (e.g., a payment service provider) determines an offer condition associated with a campaign action for a particular campaign. By including such offer conditions in the offers provided to customers, the system provider device may configure the offers such that they are initially irredeemable by the customers, and change the offers to be redeemable after the customers satisfy the offer conditions by performing the campaign action. This allows the system provider device to align the goal of the merchant offer with the goal of the campaign and send more relevant offers to the customers, which may lead to campaigns where offers are used more efficiently. As used herein, "campaign" may include activities (e.g., marketing activities) that have a goal to bring about a particular result (e.g., attracting a particular number of customers to use a product or a feature of a product, to participate in an online survey, to provide reviews of products and/or services).

Referring now to FIG. 1, an embodiment of a method 100 for providing campaign driven offer distribution is illustrated. In the embodiments discussed below, a payment service provider such as, for example, PayPal, Inc. of San Jose, CA is the system provider and operates a system provider device (e.g., payment service provider device) to efficiently distribute offers to customers to incentivize the customers to participate in the campaigns. However, one of skill in the art in possession of the present disclosure will recognize that a variety of other system providers such as, for example, discount providers, marketplace providers, merchants, and/or other entities will benefit from the teachings herein and thus fall within the scope of the present disclosure.

The method 100 may begin at block 102, where the system provider receives campaign information from a service provider device associated with a service provider. The service provider may be a payment service provider, a social network service provider, a discount service provider, a rewards service provider, a marketing service provider, and/or any service provider. The service provider device may send campaign information to the system provider device 200 to initiate a campaign for a particular product and/or a particular feature of the product provided by the service provider so that customers are incentivized to use the particular product and/or feature.

Figure 2:
FIG. 2 is a screen shot illustrating an embodiment of a system provider device displaying a campaign information screen.

Referring now to FIG. 2, illustrated is an example of a campaign information screen 204 displayed on the system provider device 200 where the system provider device 200 has received various campaign information from one or more service provider devices. In the illustrated example, the service provider is a payment service provider providing various payment products. The campaign information screen 204 includes a campaign information section 260 displaying campaign information 208, 210, 212, and 214. The campaign information may include various information for a campaign, including for example, a campaign action 216 identifying the product and/or feature that a customer is incentivized to use, a total desired participant number 218 identifying the number of customers desired to perform the campaign action 216, a campaign period 220 identifying the time period of the campaign, a campaign status 224 identifying the status of the campaign, an actual participant number 226 identifying the number of customers that have participated in the campaign by performing the campaign action 216, and/or other information associated with the campaign. In some embodiments, the campaign information 208, 210, 212, and 214 may be provided by the same service provider device. Alternatively, the campaign information 208, 210, 212, and 214 may be provided by different service provider devices associated with different service providers.

In various embodiments, campaign information 208, 210, 212, and 214 may be associated with different campaign actions and have different campaign goals. In an example, the campaign information 208 provides a campaign for a campaign action 216 (e.g., "MAKE A CROSS-BORDER PERSON TO PERSON PAYMENT") associated with a cross-border payment feature of a person to person payment product provided by the service provider. The campaign goal is to attract a total desired participant number 218 (e.g., "1000") of customers during a campaign period 220 (e.g., "1 MONTH") to perform the campaign action 216. The campaign information 208 includes a campaign status 224 (e.g., "CAMPAIGN REQUEST RECEIVED") indicating that the system provider device 200 has received the campaign information, but has not started distributing campaign materials and/or offers to customers. The campaign information 208 includes an actual participant number 226 (e.g., "0") indicating that no customer has participated in the campaign yet.

In another example, the campaign information 210 provides a campaign associated with a campaign action 216 (e.g., "REFER FRIENDS AND FAMILY") associated with a product provided by the service provider, and the campaign goal is to attract a total desired participant number 218 (e.g., "500") of customers during a campaign period 220 (e.g., "10 DAYS") to perform the campaign action 216. The campaign information 210 includes a campaign status 224 (e.g., "ACTIVE") indicating that the system provider device 200 has started the campaign (e.g., by distributing offers to customers), and the campaign is currently active. The campaign information 210 includes an actual participant number 226 (e.g., "400") indicating that 400 customers have participated in the campaign.

In yet another example, the campaign information 212 provides that the campaign is associated with a campaign action 216 (e.g., "ADD A BANK ACCOUNT") associated with a payment product provided by the service provider, and the campaign goal is to attract a total desired participant number 218 (e.g., "300") of customers during a campaign period 220 (e.g., "5 DAYS") to perform the campaign action 216 and add a bank account to the payment product. The campaign information 212 includes a campaign status 224 (e.g., "COMPLETED") indicating that the system provider device 200 has completed the campaign. The campaign information 212 includes an actual participant number 226 (e.g., "300") providing that 300 customers participated in the campaign, and the campaign goal is met.

In yet another example, the campaign information 214 provides a campaign associated with a campaign action 216 (e.g., "FOREIGN PAYMENT TRANSACTION") associated with a product provided by the service provider, and the campaign goal is to attract a total desired participant number 218 (e.g., "100") of customers during a campaign period 220 (e.g., "3 DAYS") to perform the campaign action 216. The campaign information 214 includes a campaign status 224 (e.g., "COMPLETED") indicating that the system provider device 200 has completed the campaign. The campaign information 214 includes an actual participant number 226 (e.g., "90") providing that 90 customers participated in the campaign, and the campaign goal of attracting 100 participants is not met. While a few examples of campaign information have been illustrated and described, one of skill in the art in possession of the present disclosure will recognize that other types of campaign information for other types of campaigns will fall within the scope of the present disclosure as well.

Figure 3A:
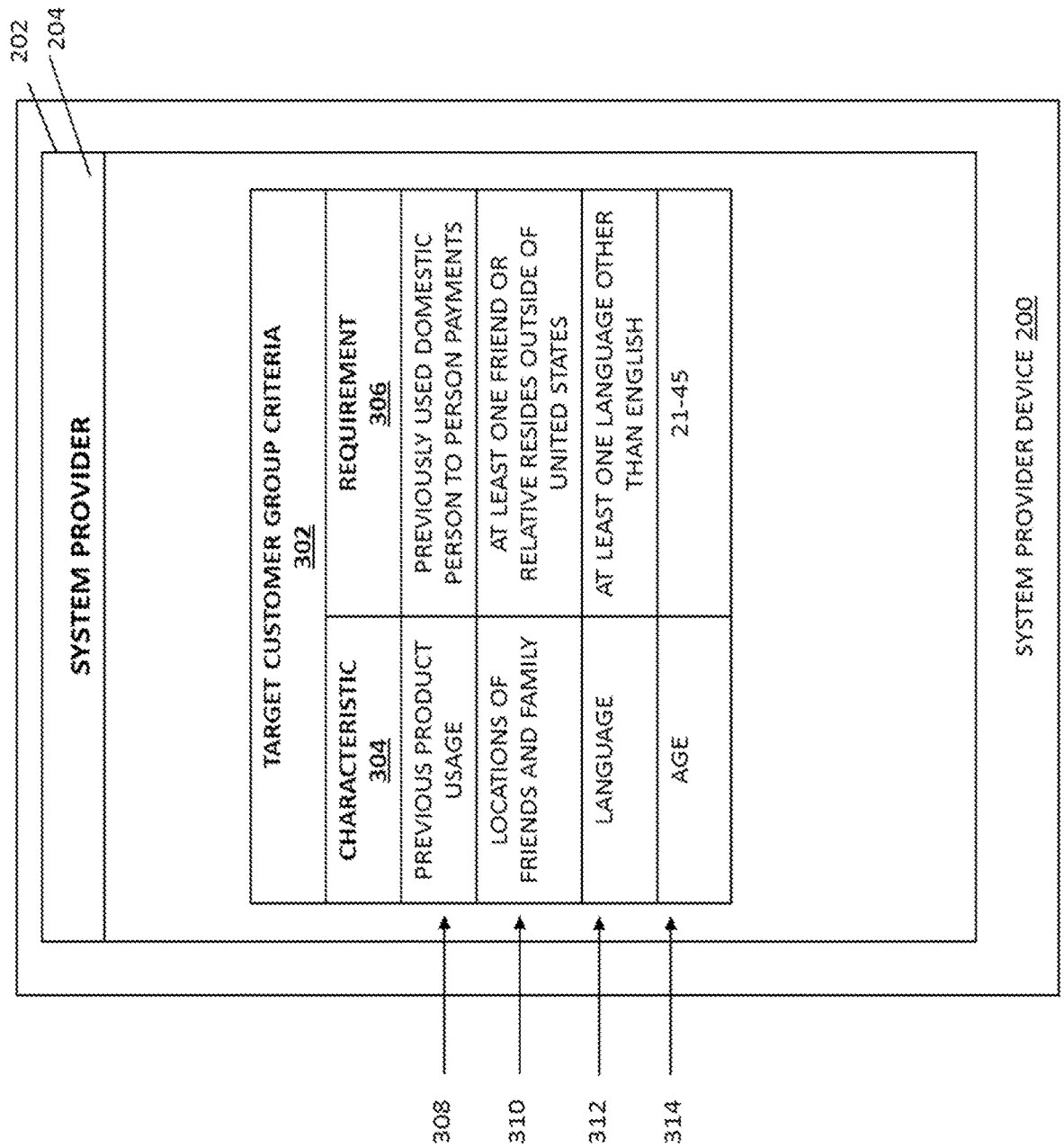
FIG. 3A is a screen shot illustrating an embodiment of a system provider device displaying a target customer group screen.

Referring to FIGS. 1 and 3A, the method 100 proceeds to block 104, where the system provider device determines a target customer group for an effective campaign. Referring to FIG. 3A, illustrated is an example of a target customer group screen 302 displayed on a display device 202 of the system provider device 200. The target customer group screen 302 includes a target customer group criteria section displaying target customer group criteria 302 for the campaign associated with the campaign information 208. In the example of FIG. 3A, the target customer group criteria 302 includes customer characteristic requirements 308, 310, 312, and 314, where each requirement may provide a requirement 306 for a particular customer characteristic 304. In an example, the customer characteristic requirement 308 requires that the customers have previously used the domestic person to person payments provided by the service provider. In another example, the customer characteristic requirement 310 requires that each customer of the target customer group has at least one friend or relative residing outside of the United States. In yet another example, the customer characteristic requirement 312 requires that each customer of the target customer group speaks at least one language other than English. In yet another example, the customer characteristic requirement 313 requires that the customer has an age in a range between 21 and 45. In some embodiments, the system provider device 200 retrieves customers of the target customer group from a customer database coupled to the system provider device 200 and/or the service provider device using the target customer group criteria 302.

In some embodiments, for different customer characteristic requirements 308, 310, 312, and 314, the system provider device 200 uses different sources (e.g., a social network, the service provider, a customer database) to determine whether a customer satisfies the customer characteristic requirements. In an example, the system provider device 200 determines that a customer satisfies a customer characteristic requirement 308 by retrieving, from a service provider device associated with the service provider, previous product usage information associated with the customer, where the previous product usage information indicates that the customer previously used the domestic person to person payment product provided by the service provider. In another example, the system provider device determines whether a customer satisfies a customer characteristic requirement 310 by retrieving, from a social network device associated with a social network service provider, friends and family information associated with the customer, where the retrieved friends and family information indicates that the customer has a friend residing outside of the United States.

In some embodiments, the target customer group criteria 302 are adjusted (e.g., by adding/removing customer characteristic requirements, or adjusting the requirement 306 for a particular customer characteristic 304) based on the total desired participant number 218 (e.g., 1000) of the campaign information 208, so that the target customer group has the desired customer number. In some embodiments, the customer number of the target customer group is in a range between about two times (e.g., 2000) and five times (e.g., 5000) of the total desired participant number 218 (e.g., determined based on actual participants and distributed offers ratio in past campaigns). However, other customer numbers of the target customer group are envisioned as falling within the scope of the present disclosure as well.

Figure 3B:
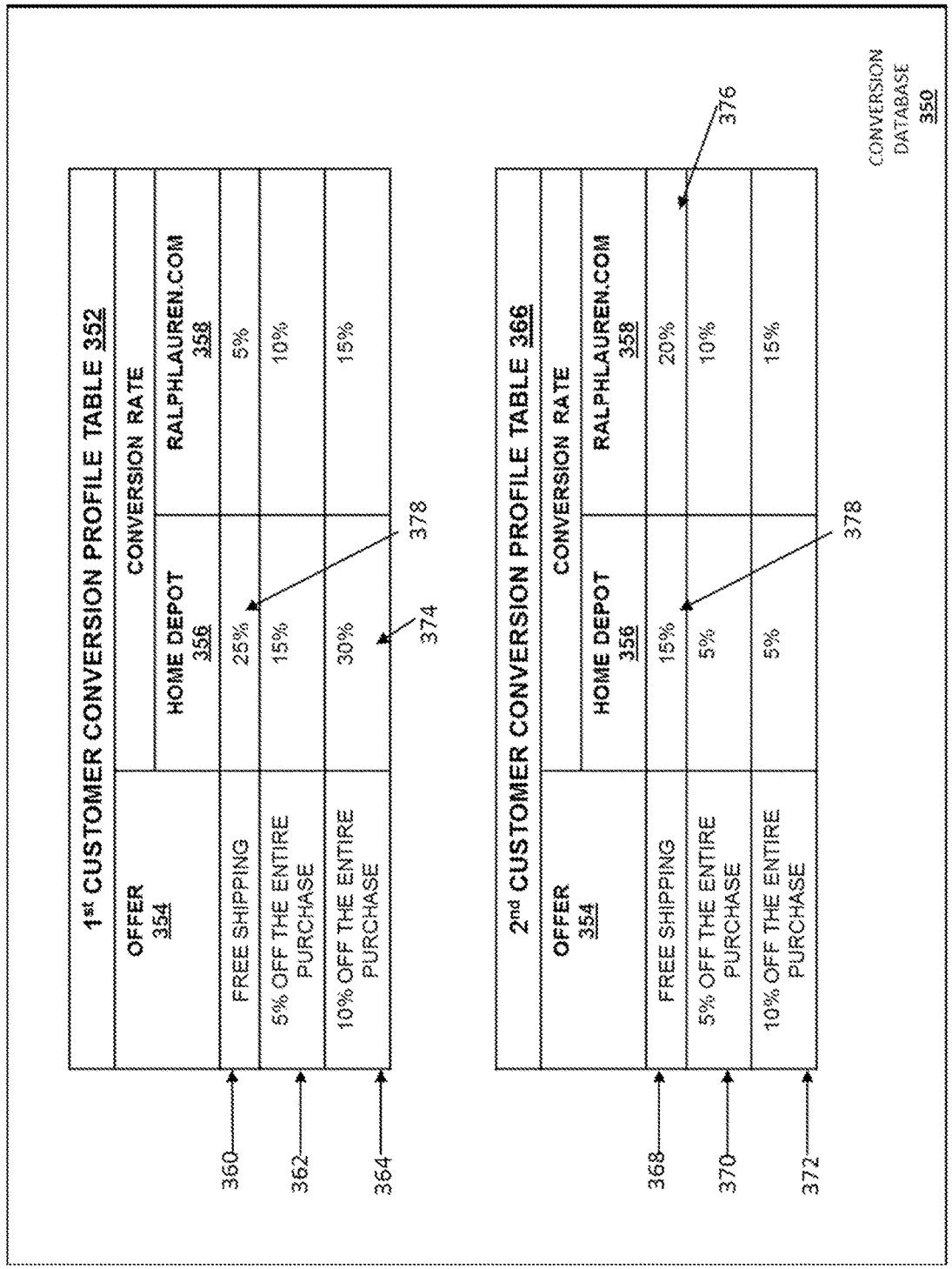
FIG. 3B is a screen shot illustrating an embodiment of a conversion database in a campaign driven offer distribution system.

Referring to FIGS. 1 and 3B, the method 100 proceeds to block 106, where the system provider device determines one or more merchant offers for the customers of the target customer group. In some embodiments, the merchant offers are determined using conversion profiles of the customers.

Referring to FIG. 3B, illustrated is an embodiment of a conversion database. The conversion database includes a conversion profile table 352 associated with a first customer of the target customer group, and a conversion profile table 366 associated with a second customer of the target customer group. In the illustrated example, the conversion profile tables 352 and 366 include columns that provide an offer configuration field 354, and conversion rate fields for various merchants (e.g., a conversion rate field 356 for the merchant "HOME DEPOT," a conversion rate field 358 for the merchant "RALPHLAUREN.COM") for any of a plurality of rows in the conversion profile tables 352 and 366.

In some embodiments, the system provider device 200 determines that different merchant offers will be distributed to different customers of the target customer group (e.g., based on conversion profiles associated with the customers). In an example, the system provider device 200 determines that a discount offer 374 will be provided to the first customer, because the discount offer 374 providing 10% off the entire purchase from the merchant HOME DEPOT has the highest conversion rate (e.g., at 30%) according to the conversion profile information 364 compared to other offers (e.g., a free shipping offer from the merchant RALPHLAUREN.COM corresponding to a 5% conversion rate according to the conversion profile information 360, a discount offer providing 5% off the entire purchase from the merchant HOME DEPOT corresponding to a 15% conversion rate according to the conversion profile information 362). In such an example, the system provider device 200 determines that a free shipping offer 376 will be provided to the second customer, because the free shipping offer 376 providing free shipping from the merchant RALPHLAUREN.COM has the highest conversion rate (e.g., at 20%) according to the conversion profile information 368 compared to other offers (e.g., a discount offer providing 5% off the entire purchase from the merchant HOME DEPOT corresponding to a 5% conversion rate according to the conversion profile information 370, and a discount offer providing 10% off the entire purchase from the merchant RALPHLAUREN.COM corresponding to a 15% conversion rate according to the conversion profile information 372).

In some embodiments, the system provider device 200 may determine that a single merchant offer will be distributed to all customers of the target customer group. In such embodiments, an average conversion rate averaged over all customers of the target customer group may be used to determine the merchant offer. In an example, the system provider device 200 determines that a free shipping offer 378 from the merchant HOME DEPOT will be distributed to a target customer group including the first customer and the second customer, because the free shipping offer 378 has the highest average conversion rate (e.g., at 20%) for the first customer, the second customer, and/or other customers of the target customer group compared with other offers (e.g., a discount offer 374 providing 10% off the entire purchase from the merchant HOME DEPOT corresponding to a 17.5% average conversion rate for the first customer and the second customer).

Figure 4:
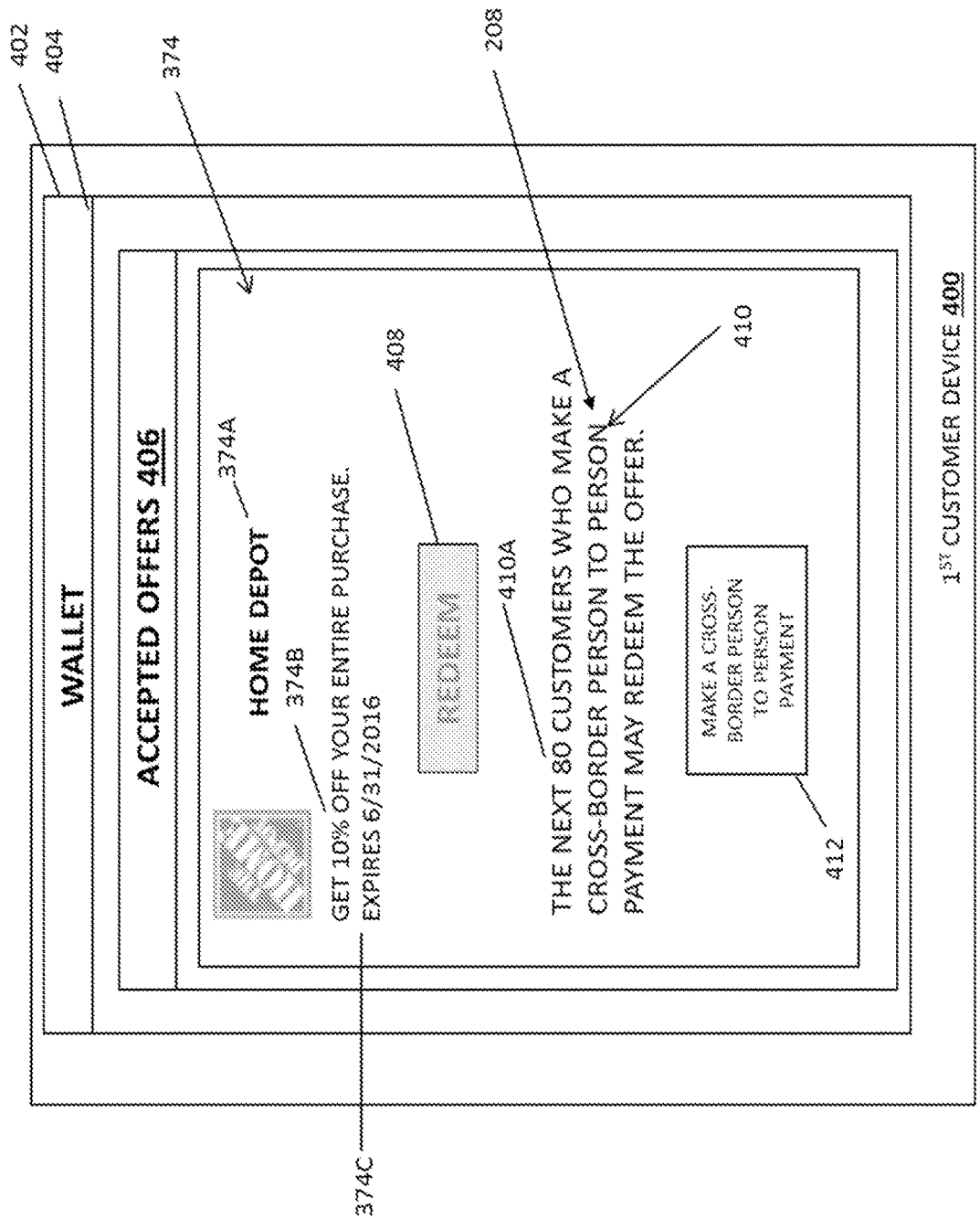
FIG. 4 is a screen shot illustrating an embodiment of a first customer device displaying an accepted offers screen.

Referring to FIGS. 1 and 4, the method 100 proceeds to block 108 where the system provider device 200 provides a discount offer 374 to the first customer device. The discount offer 374 has been configured such that it has an initial status that is irredeemable by the first customer. Referring to FIG. 4, illustrated is an accepted offers screen 404 displayed on a display device 402 of the first customer device 400. In some embodiments, the accepted offers screen 404 is provided through an application (e.g., a digital wallet application) provided by a system provider such as, for example, PayPal Inc. of San Jose, CA. The accepted offers screen 404 includes an accepted offers section 406 displaying offers that have been accepted by the first customer, including the discount offer 374. The discount offer 374 includes a merchant name 374A (e.g., "HOME DEPOT"), a discount configuration 374B (e.g., "10% OFF YOUR ENTIRE PURCHASE"), and an expiration date 374C (e.g., "Jun. 31, 2016"). In some examples, the expiration date 374C is determined based on a campaign period 220 (e.g., "1

MONTH") of the campaign information 208, and identifies when the campaign ends. The accepted offers section 406 includes a "REDEEM" button 408, which is disabled as the offer 374 is not redeemable by the first customer yet. An offer condition 410 associated with the campaign information 208 provides that the offer 374 will become redeemable after the first customer performs the campaign action 216 of the campaign information 208 (e.g., "MAKE A CROSS-BORDER PERSON TO PERSON PAYMENT").

In some embodiments, the system provider device 200 may provide a total redeemable offer number (e.g., a number that is the same as the total desired participant number 218) which limits the total number of offers that may become redeemable in the campaign. In an example, the system provider device 200 may notify the customers a remaining redeemable offers number to convey a sense of urgency, which may compel the customers to take an instant action to participate in the campaign. Referring to FIG. 4, a remaining redeemable offers number 410A (e.g., "80") is included in the offer condition 410, notifying the first customer that the offer 374 will become redeemable if the first user is one of the next 80 customers performing the campaign action 216. In such examples, a total redeemable offer number is provided to be the same as the total desired participant number 218 (e.g., 1000) of the campaign information 208. At the particular time, a total of 920 customers have participated in the campaign by performing the campaign action 216, and received redeemable offers. The system provider device 200 may update the remaining redeemable offers number 410A at some time interval (e.g., five minutes), every time that the first customer opens the accepted offers screen 404, and/or every time that a customer of the target customer group participate in the campaign by performing the campaign action 216 of the campaign information 208.

In some embodiments, the first customer may select the "MAKE A CROSS-BORDER PERSON TO PERSON PAYMENT" button 412 to perform the campaign action 216 of the campaign information 208. For example, the button 412 may direct the first customer to a person to person payment application provided by the service provider device, where the first customer may make a cross-border person to person payment.

Figure 5:
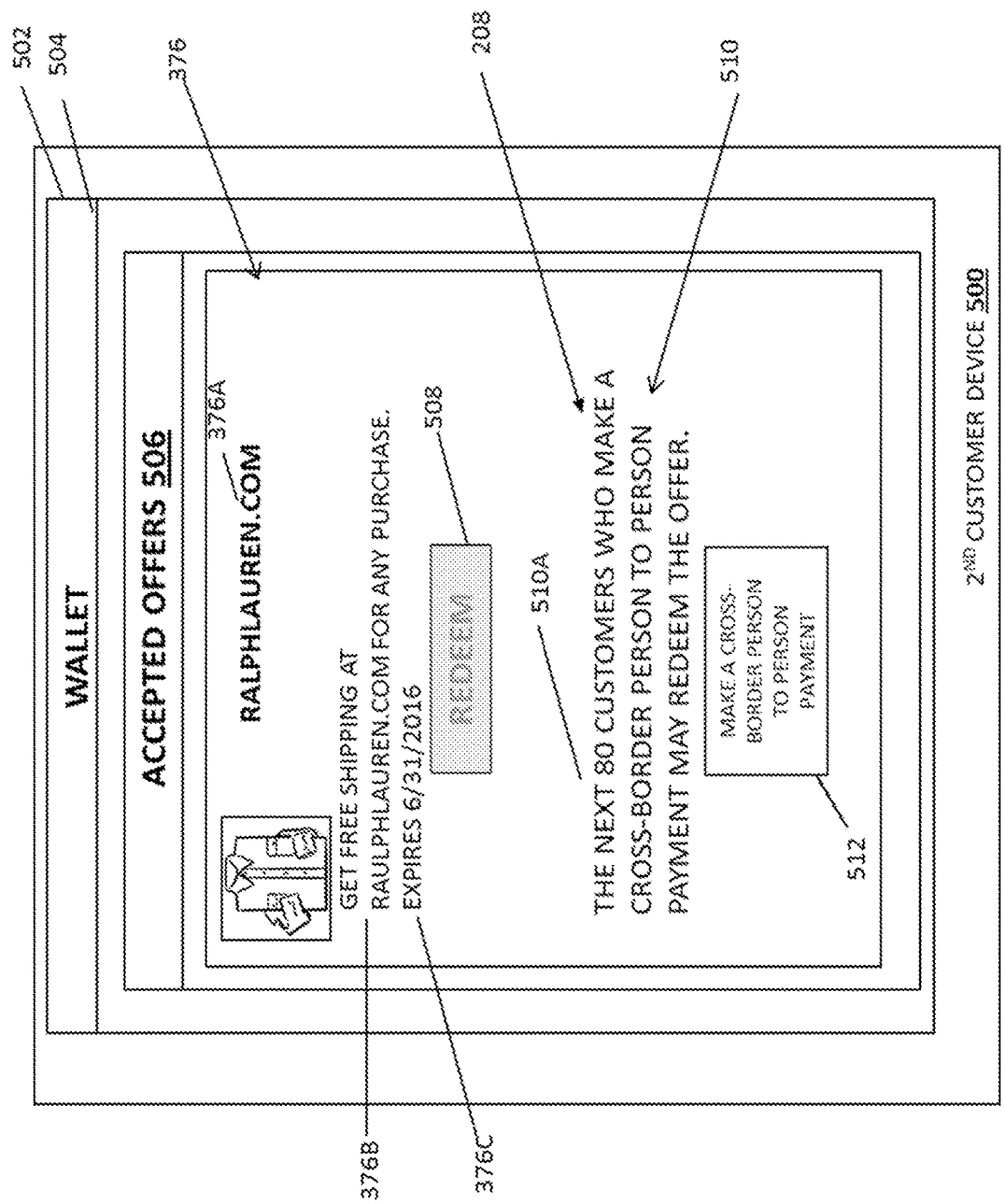
FIG. 5 is a screen shot illustrating an embodiment of a second customer device displaying an accepted offers screen.

Referring to FIGS. 1 and 5, the method 100 proceeds to block 110, where the system provider device 200 provides a free shipping offer 376 to the second customer device. At this stage, the free shipping offer 376 has been configured such that it is irredeemable by the second customer. Referring to FIG. 5, illustrated is an accepted offers screen 504 displayed on a display device 502 of the second customer device 500. In some embodiments, the accepted offers screen 506 is provided through an application (e.g., a digital wallet application) provided by a system provider such as, for example, PayPal Inc. of San Jose, CA. The accepted offers screen 504 includes an accepted offers section 506 displaying offers that have been accepted by the second customer, including the free shipping offer 376. The free shipping offer 376 includes a merchant name 376A (e.g., "RALPHLAUREN.COM"), an offer configuration 376B (e.g., "FREE SHIPPING"), and an expiration date 376C (e.g., "Jun. 31, 2016"). In some examples, the expiration date 376C is determined based on a campaign period 220 (e.g., "1 MONTH") of the campaign information 208, and identifies when the campaign ends, and is a date that is the same as the expiration date 374C of the discount offer 374 described above with reference to FIG. 4. The accepted offers section 506 includes a disabled "REDEEM" button 508. An offer condition 510 associated with the campaign information 208 provides that the offer 376 is redeemable after the second customer performs the campaign action 216 (e.g., "MAKE A CROSS-BORDER PERSON TO PERSON PAYMENT") of the campaign information 208.

Referring to FIG. 5, a remaining redeemable offers number 510A (e.g., "80") is included in the offer condition 510, notifying the second customer that the offer 376 will be changed to be redeemable if the second user is one of the next 80 customers performing the campaign action 216. In such examples, at the particular time, a total of 920 customers have participated in the campaign by performing the campaign action 216, and only 80 more participants are needed to achieve the total desired participant number 218 (e.g., 1000) of the campaign information 208. The system provider device 200 may update the remaining redeemable offers number 510A every predetermined interval (e.g., five minutes), or every time that the first customer opens the accepted offers screen 504.

In some embodiments, the second customer may select the "MAKE A CROSS-BORDER PERSON TO PERSON PAYMENT" button 512 to perform the campaign action 216 of the campaign information 208. For example, the button 512 may direct the second customer to a person to person payment application provided by the service provider device, where the second customer may make a cross-border person to person payment.

The examples illustrated in FIGS. 4 and 5 are not intended to be limiting, and the offers 374 and 376 may be provided to the first customer device 400 and the second customer device 500 in a variety of manners (through a website, an application, a TV, newsfeed, as a message (e.g., an email, a text message, a picture message, a "pop-up", a voice call, etc.)) without departing from the scope of the present disclosure.

Referring to FIGS. 1 and 6, the method 100 proceeds to block 112, where the system provider device 200 receives an offer condition satisfied notification from the service provider device after the first customer participates in the campaign. Referring to FIG. 6, illustrated is a person-to-person payment screen 602 provided by the service provider device displayed on a display device 402 of the first customer device 400, where the first customer is directed to after selecting the "MAKE A CROSS-BORDER PERSON TO PERSON PAYMENT" button 412 of FIG. 4. The person-to-person payment screen 602 includes a cross-border person-to-person payment section 604 displaying a person-to-person payment request 606 provided by the first customer. The cross-border person-to-person payment request 606 may include fields to identify various information associated with the cross-border person-to-person payment request 606, for example, a payee country field 608 (e.g., "PHILIPPINES"), a payee name field 610 (e.g., "JOHN DOE"), an amount field 612 (e.g., "$50.00 USD"), a note field 614 (e.g., "HAPPY BIRTHDAY"). The first customer may choose the "SEND" button 616 to send the cross-border person-to-person payment request 606 to the service provider device.

In some embodiments, after receiving the cross-border person-to-person payment request 606 from the first customer device 600, the service provider device performs a payment (e.g., sending $50.00 from the first customer's account to an account associated with JOHN DOE residing in PHILIPPINES), and sends an offer condition satisfied notification to the system provider device 200. In a particular example, the offer condition satisfied notification include an identifier of the first customer, the offer information for the discount offer 374, and the campaign information 208 indicating that the first customer has satisfied the offer condition associated with the discount offer 374 by performing the campaign action 216 of the campaign information 208.

Referring to FIGS. 1 and 7, the method 100 proceeds to block 114, where after receiving the offer condition satisfied notification, the system provider device 200 reconfigures the discount offer 374 such that the discount offer 374 is redeemable by the first customer, and provides an offer status change notification associated with the discount offer 374 to the first customer device 400 to cause the discount offer 374 to displayed on the first customer device 400 such that the discount offer 374 is redeemable by the first customer. Referring to FIG. 7, illustrated is an accepted offers screen 406 displayed on a display device 402 of the first customer device 400, where the offer 374 has been changed to be redeemable according to the offer status change notification. In an example, the offer 374 includes a redemption code 702 (e.g., "1932342372342321") that the first customer may use to redeem the offer 374. In another example, the "REDEEM" button 408 is enabled, which may direct the first customer to a website or application provided by the merchant of the offer 374 (e.g., "HOME DEPOT") to redeem the offer 374.

Figure 8A:
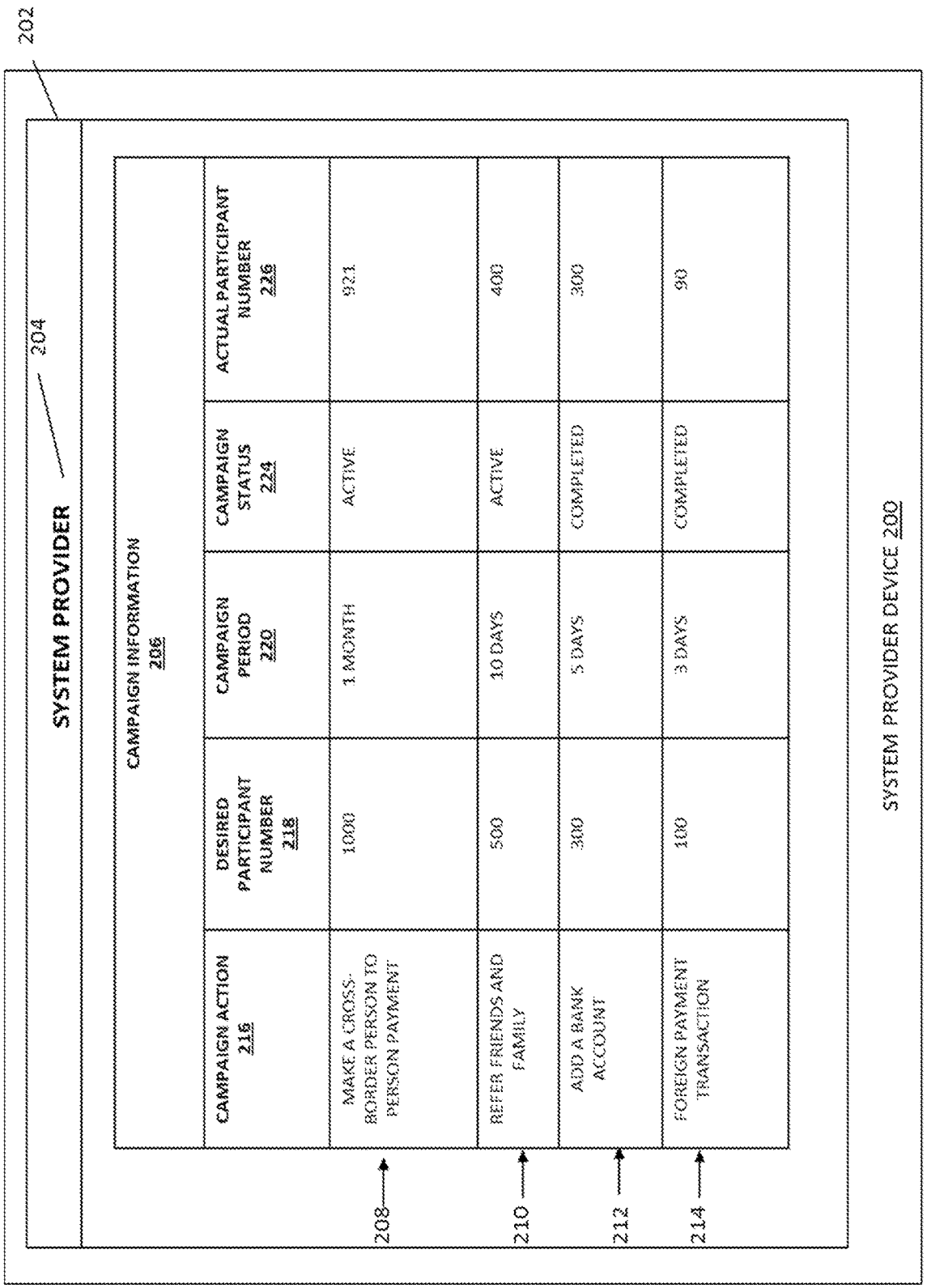
FIG. 8A is a screen shot illustrating an embodiment of a system provider device displaying a campaign information screen.

Referring to FIGS. 1, 8A, and 8B, the method 100 proceeds to block 116, where the system provider device 200 updates the campaign information according to the offer condition satisfied notification received from the service provider. Referring to FIG. 8A, in some embodiments, after the first customer performs the campaign action 216, the system provider device 200 determines that the desired participant number 218 of the campaign information 208 is still not met. Illustrated in FIG. 8A is an example of a campaign information screen 204 displayed on the system provider device 200, where the campaign information 208 has been updated by the system provider device 200 according to the offer condition satisfied notification. In the example illustrated in FIG. 8A, the actual participant number 226 is increased by one from "920" to "921" to include the first customer. The system provider device 200 may determine that the updated actual participant number 226 (e.g., "921") has not met the desired participant number 218 (e.g., "1000"), and do not change the campaign status 224 (e.g., the campaign status remains to be "ACTIVE").

Referring now to FIG. 8B, in some embodiments, after the first customer performs the campaign action 216, the system provider device 200 determines that the desired participant number 218 of the campaign information 208 is met. Illustrated in FIG. 8B is an example of a campaign information screen 204 displayed on the system provider device 200, where the campaign information 208 has been updated by the system provider device 200 according to the offer condition satisfied notification. In some embodiments, the actual participant number 226 is increased by one from "999" to "1000" to include the first customer. The system provider device 200 determines that the updated actual participant number 226 (e.g., "1000") has met the desired participant number 218 (e.g., "1000"), and changes the campaign status 224 from "ACTIVE" to "COMPLETED."

Referring to FIGS. 1, 9A, 9B, and 9C, the method 100 proceeds to block 118, where the system provider device 200 provides an offer status change notification associated with the offer 376 to the second customer device to update the offer 376 displayed on the second customer device based on the updated campaign information 208.

Figure 9A:
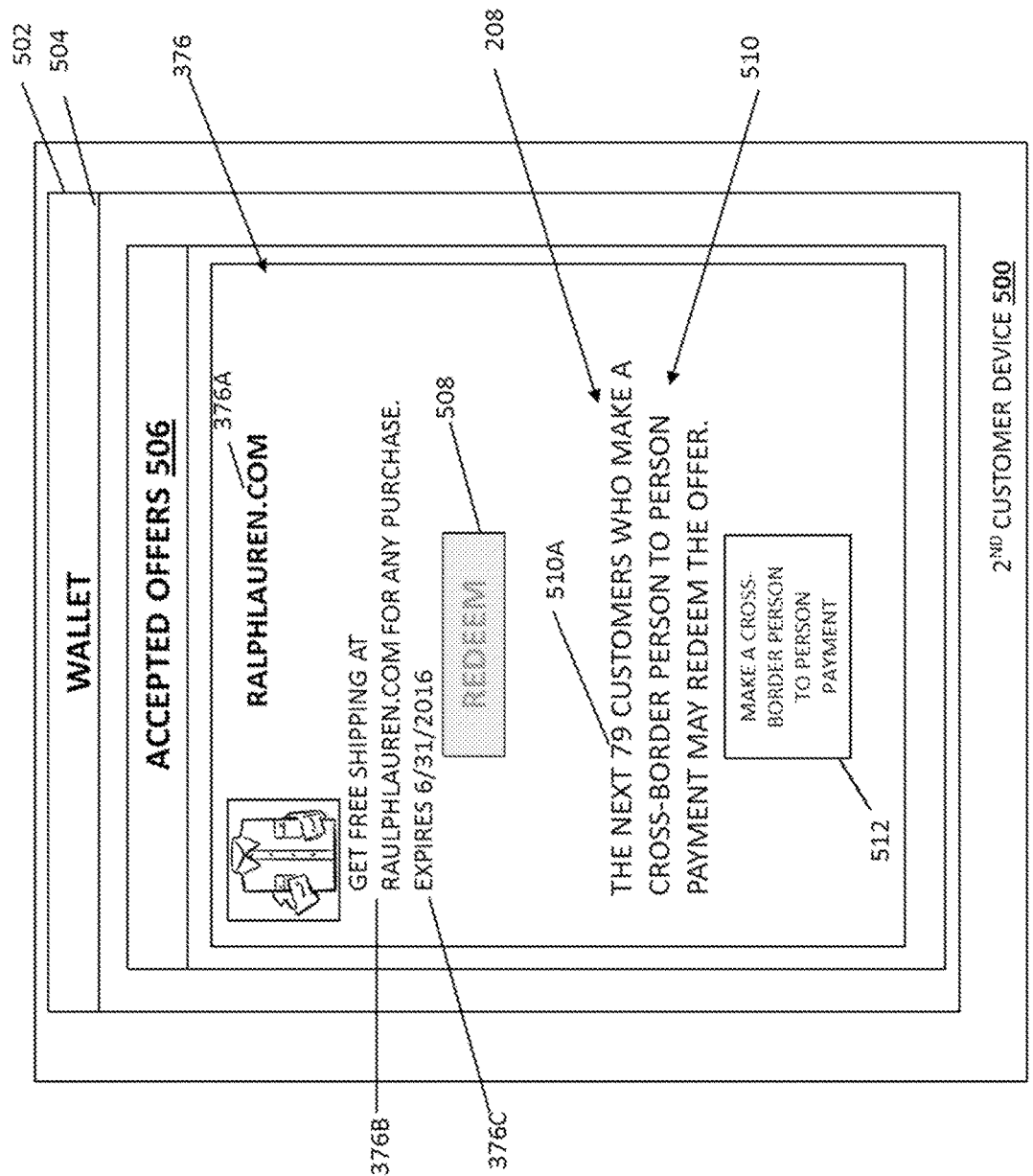
FIG. 9A is a screen shot illustrating an embodiment of a second customer device displaying an accepted offers screen.

Referring to FIG. 9A, in some embodiments, the system provider device 200 determines that the campaign associated with the campaign information 208 is active (e.g., after determining that the actual participant number 226 has not met the desired participant number 218 as illustrated in FIG. 8A), and sends an offer status change notification including a remaining redeemable offer number change notification to the second customer device. In an example, the system provider device 200 determines that a total of 921 customers have participated in the campaign by performing the campaign action 216 of the campaign information 208, calculates the remaining redeemable offers number by deducting the actual participant number 226 (e.g., "921") from the desired participant number 218 (e.g., "1000"), and provides the remaining redeemable offer number change notification including the remaining redeemable offer number (e.g., "79") to the second customer device 500.

Illustrated in FIG. 9A is an accepted offers screen 504 displayed on a display device 502 of the second customer device 500, after the second customer device 500 receives the remaining redeemable offer number change notification from the system provider device 200. The accepted offers screen 504 displays an offer condition 510 associated with the campaign information 208. The offer condition 510 includes the updated remaining redeemable offers number 510A (e.g., "79") provided by the remaining redeemable offer number change notification. In some embodiments, the second customer may select the "MAKE A CROSS-BORDER PERSON TO PERSON PAYMENT" button 512 to perform the campaign action 216 of the campaign information 208. For example, the button 512 may direct the second customer to a person to person payment application provided by the service provider device.

Figure 9B:
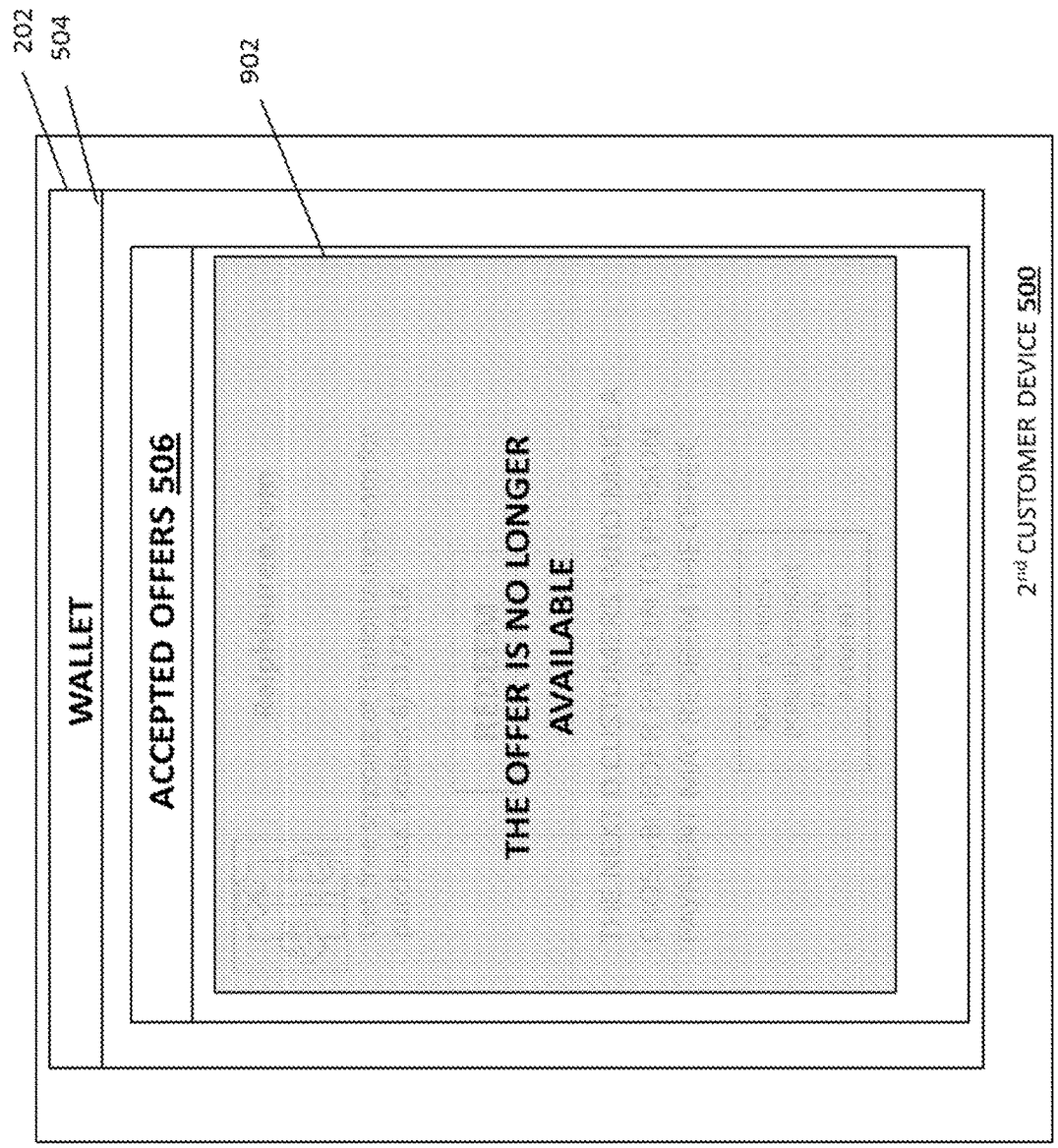
FIG. 9B is a screen shot illustrating an embodiment of a second customer device displaying an accepted offers screen.

Referring to FIG. 9B, in some embodiments, the system provider device 200 determines that the campaign associated with the campaign information 208 is completed (e.g., after the actual participant number 226 reaches the desired participant number 218 as illustrated in FIG. 8B and/or the campaign period 220 is up), and sends an offer status change notification including an offer unavailable notification to the second customer device 500. Illustrated in FIG. 9B is an accepted offers screen 504 displayed on a display device 502 of the second customer device 500, after the second customer device 500 receives the offer unavailable notification from the system provider device 200. In the accepted offers screen 504, the offer 376 is removed or disabled, and an offer unavailable notification 902 is displayed to notify the second customer that the offer 376 is no longer available.

Figure 9C:
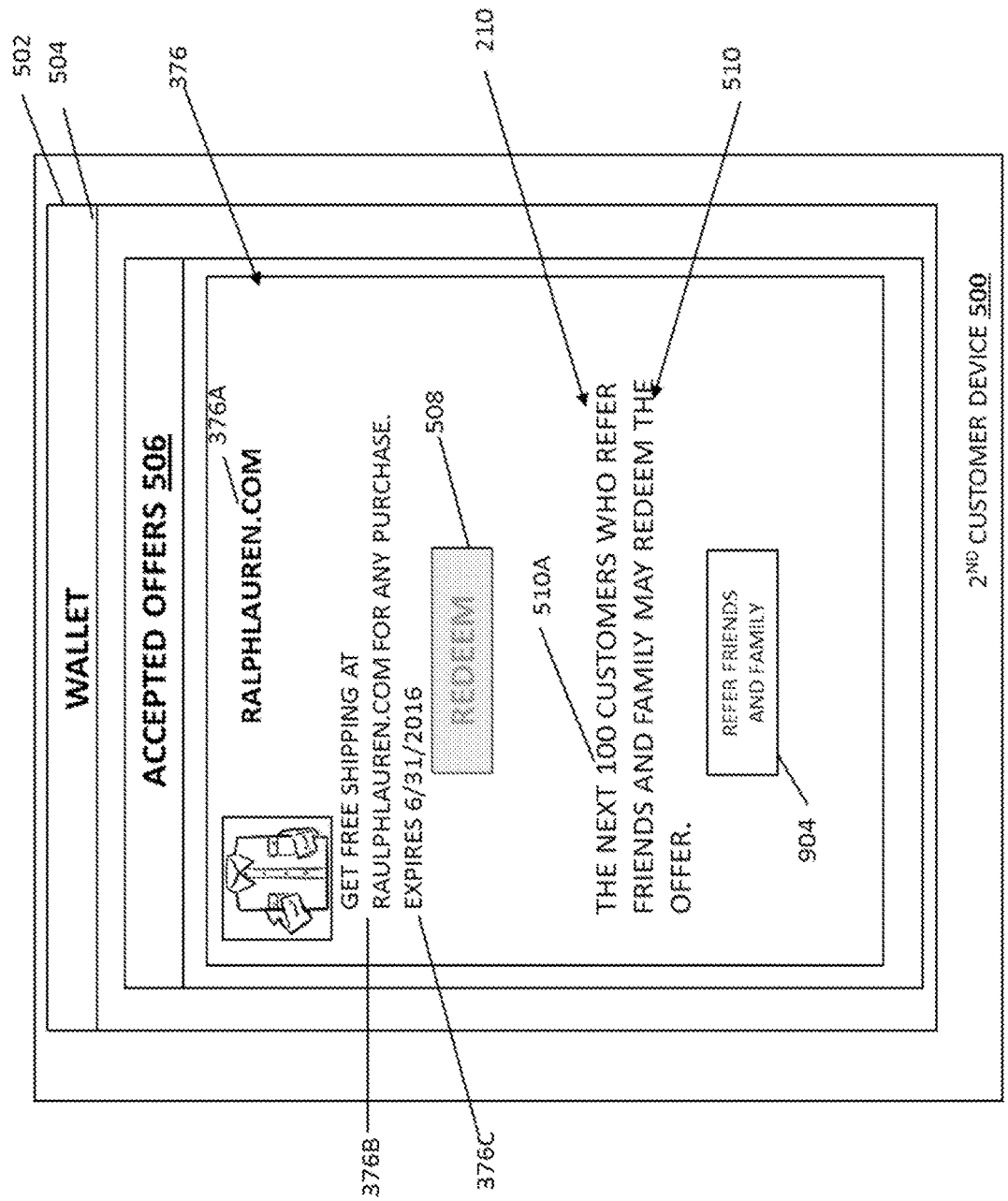
FIG. 9C is a screen shot illustrating an embodiment of a second customer device displaying an accepted offers screen.

Referring to FIG. 9C, in some embodiments, the system provider device 200 determines that the campaign associated with the campaign information 208 is completed (e.g., after the actual participant number 226 reaches the desired participant number 218 as illustrated in FIG. 8B and/or the campaign period 220 is up), and sends an offer status change notification including a campaign information changed notification to the second customer device 500. In an example, the system provider device 200 determines that the campaign information 201 is active and needs more customers to participate in the campaign. In that example, the system provider device 200 sends an offer status change notification including a campaign information changed notification to the second customer device 500. The campaign information changed notification includes the campaign information 210 providing that the offer condition of the offer 376 is changed to be associated with the campaign information 210.

Illustrated in FIG. 9C is an accepted offers screen 504 displayed on a display device 502 of the second customer device 500, after the second customer device 500 receives the campaign information changed notification from the system provider device 200. The accepted offer screen 504 includes an accepted offers section 506 displaying the offer 376 including the offer condition 510. The offer condition 510 is changed to require performing a campaign action 216 (e.g., "REFER FRIENDS AND FAMILY") of the campaign information 210 according to the campaign information changed notification. A remaining redeemable offers number 510A (e.g., "100") of the offer condition 510 is updated according to the campaign information 210, which notifies the second customer that the offer 376 will be changed to be redeemable if the second user is one of the next 100 customers performing the campaign action 216 of the campaign information 210. The system provider device 200 may update the remaining redeemable offers number 510A every predetermined interval (e.g., five minutes), or every time that the second customer opens the accepted offers screen 504 according to the campaign information 210.

Thus, systems and methods for providing campaign driven offer distribution have been described that operate to provide customers, merchants, system providers, and service providers a campaign driven offer distribution system that may distribute offers to help achieve various campaign goals efficiently. After receiving a campaign goal, a system provider may determine an offer condition associated with a campaign action for achieving the campaign goal. The offers including the offer condition are distributed to customers and configured with an initial status of irredeemable. To change the offer status to be redeemable, the customers are incentivized to participate in the campaign by performing the campaign action as required by the offer condition. This allows the system provider device to use the offers in the campaign more efficiently for achieving the campaign goal. Moreover, the system provider device may automatically update a remaining redeemable offer number associated with an offer displayed for a customer when other customers participate in the campaign, which may convey a sense of urgency compelling that customer to take an instant action to participate in the campaign. Furthermore, after a campaign goal for a first campaign has been achieved, the system provider device may modify the offers sent to the customers for the first campaign by associating the offer conditions of those offers with a campaign action of a second campaign, so that those sent offers may be used for the second campaign. In some embodiments, various data mining algorithms are used to further improve the efficiency of the campaign driven offer distribution system. In an example, data mining algorithms are used to analyze customer data and campaign goals to determine the target customer group for a particular campaign. In another example, data mining algorithms are used to analyze offer data and customer data to determine the offer to be provided to a particular customer in the campaign. In yet another example, after the campaign goal for the first campaign has been achieved, data mining algorithms are used to analyze customer data and active campaign data to choose a second campaign for re-using an offer which was sent in the first campaign but has not been configured to be redeemable during the first campaign. By providing a highly efficient the campaign driven offer distribution system, the performance (e.g., in computation bandwidth, speed, power consumption) of the campaign driven offer distribution system is improved.

Figure 10:
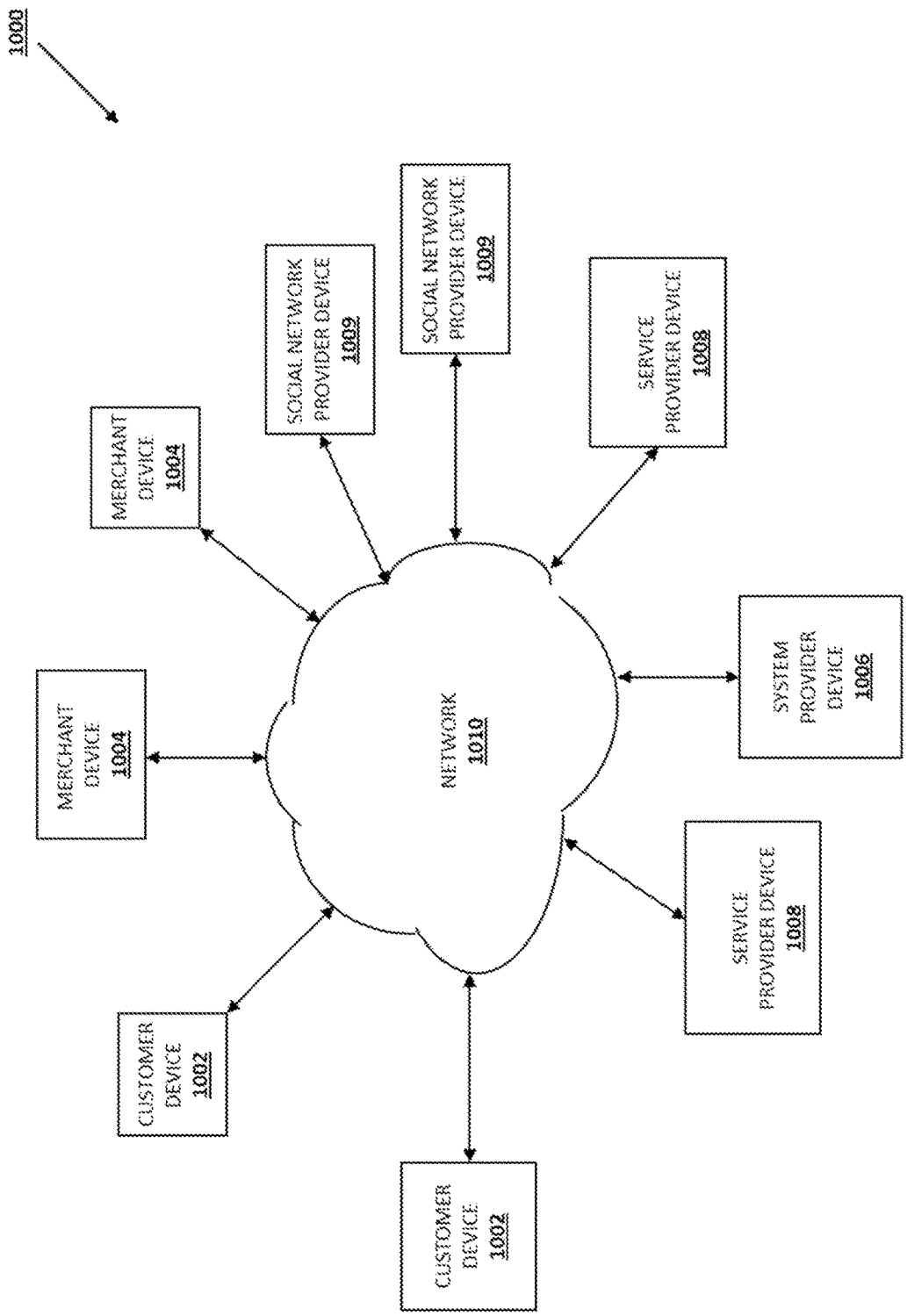
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of customer devices 1002, a plurality of merchant devices 1004, a system provider device 1006, and a plurality of service provider devices 1008, a plurality of social network service provider devices 1009 in communication over a network 1010. Any of the customer devices 1002 may be the customer devices 400 and 500 discussed above and used by the first customer and second customer discussed above. Any of the merchant devices 1004 may be the merchant device associated with the merchants discussed above. The system provider device 1006 may be the system provider device 200 discussed above and may be operated by a system provider such as, for example, PayPal Inc. of San Jose, CA. The service provider devices 1008 may be the service provider device discussed above and may be operated by various service providers including payment service providers, rewards providers, discount providers, marketplace providers, and/or any other service providers.

The customer devices 1002, merchant devices 1004, system provider device 1006, service provider devices 1008, and social network service provider devices 1009 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The customer device 1002 may be implemented using any appropriate combination of hardware and/or software configured for wired and/or wireless communication over network 1010. For example, in one embodiment, the customer device 1002 may be implemented as a personal computer of a user in communication with the Internet. In some embodiments, the customer device 1002 may be a wearable device. In some embodiments, the customer device 1002 may be a smart phone, personal digital assistant (PDA), laptop computer, and/or other types of computing devices.

The customer device 1002 may include one or more browser applications which may be used, for example, to provide a convenient interface to permit the customer to browse information available over the network 1010. For example, in one embodiment, the browser application may be implemented as a web browser configured to view information available over the Internet.

The customer device 1002 may also include one or more toolbar applications which may be used, for example, to provide user-side processing for performing desired tasks in response to operations selected by the customer. In one embodiment, the toolbar application may display a user interface in connection with the browser application.

The customer device 1002 may further include other applications as may be desired in particular embodiments to provide desired features to the customer device 1002. In particular, the other applications may include a social network application provided by a social network service provider through the social network service provider device 1008. The other applications may also include security applications for implementing user-side security features, programmatic user applications for interfacing with appropriate application programming interfaces (APIs) over the network 1010, or other types of applications. Email and/or text applications may also be included, which allow the customer to send and receive emails and/or text messages through the network 1010. The customer device 1002 includes one or more user and/or device identifiers which may be implemented, for example, as operating system registry entries, cookies associated with the browser application, identifiers associated with hardware of the customer device 1002, or other appropriate identifiers, such as a phone number. In one embodiment, the customer identifier may be used by the system provider device 1006, the service provider device 1008, and/or social network service provider device 1009 to associate the customer with a particular account as further described herein.

The merchant devices 1004 may be maintained, for example, by a conventional or on-line merchant, conventional or digital goods seller, individual seller, and/or application developer offering various products and/or services in exchange for payment to be received conventionally or over the network 1010. In this regard, the merchant devices 1004 may include a database identifying available products and/or services (e.g., collectively referred to as items) which may be made available for viewing and purchase by the customers.

The merchant devices 1004 also include a checkout application which may be configured to facilitate the purchase by the customers. The checkout application may be configured to accept payment information from the customer through the customer devices 1002, from the system provider through the system provider device 1006, and/or other system providers over the network 1010. The checkout application may also be configured to accept offer codes from the customer through the customer device 1002 to facilitate the purchase by the customers.

Figure 11:
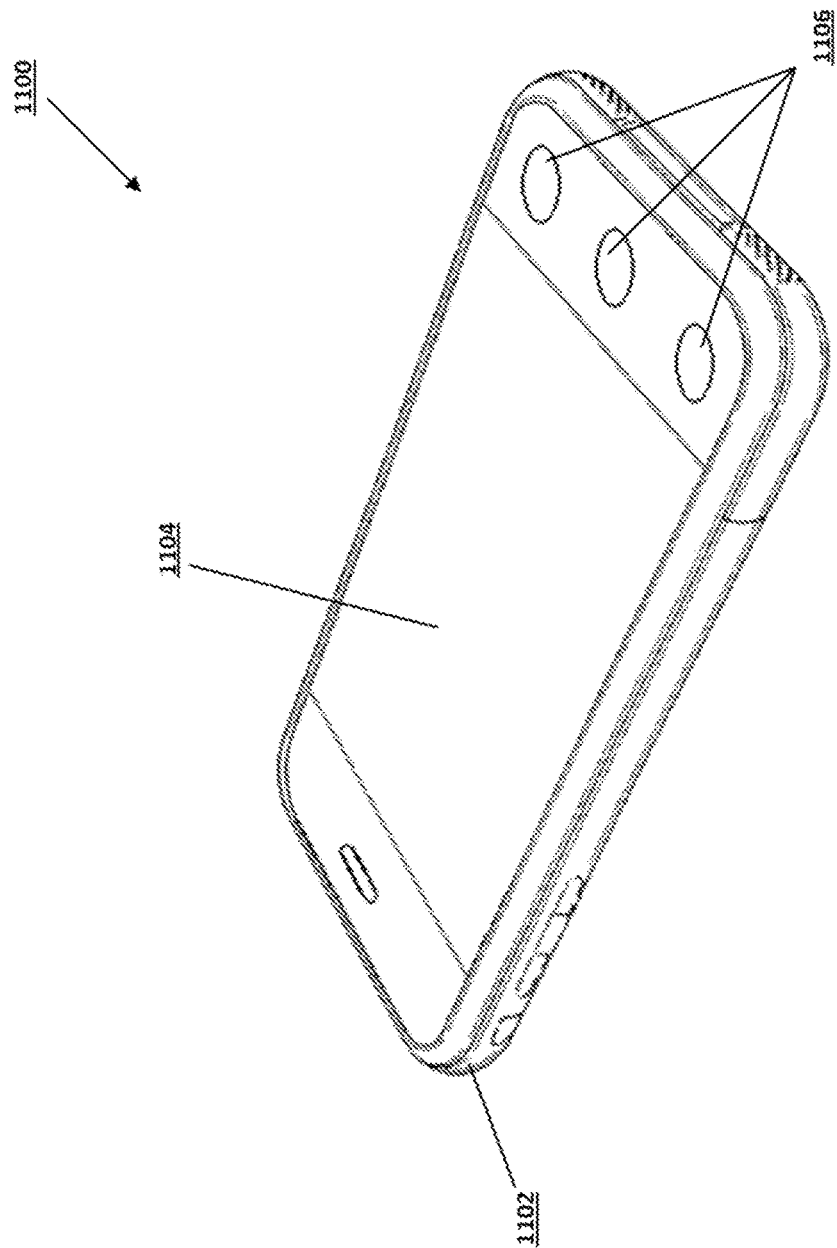
FIG. 11 is a perspective view illustrating an embodiment of a customer device.

Referring now to FIG. 11, an embodiment of a customer device 1100 is illustrated. The customer device 1100 may be the customer devices 400 or 500. The customer device 1100 includes a chassis 1102 having a display 1104 and an input device including the display 1104 and a plurality of input buttons 1106. One of skill in the art will recognize that the customer device 1100 is a portable or mobile phone including a touch screen input device and a plurality of input buttons that allow the functionality discussed above with reference to the method 100. However, a variety of other portable/mobile customer devices may be used in the method 100 without departing from the scope of the present disclosure.

Figure 12:
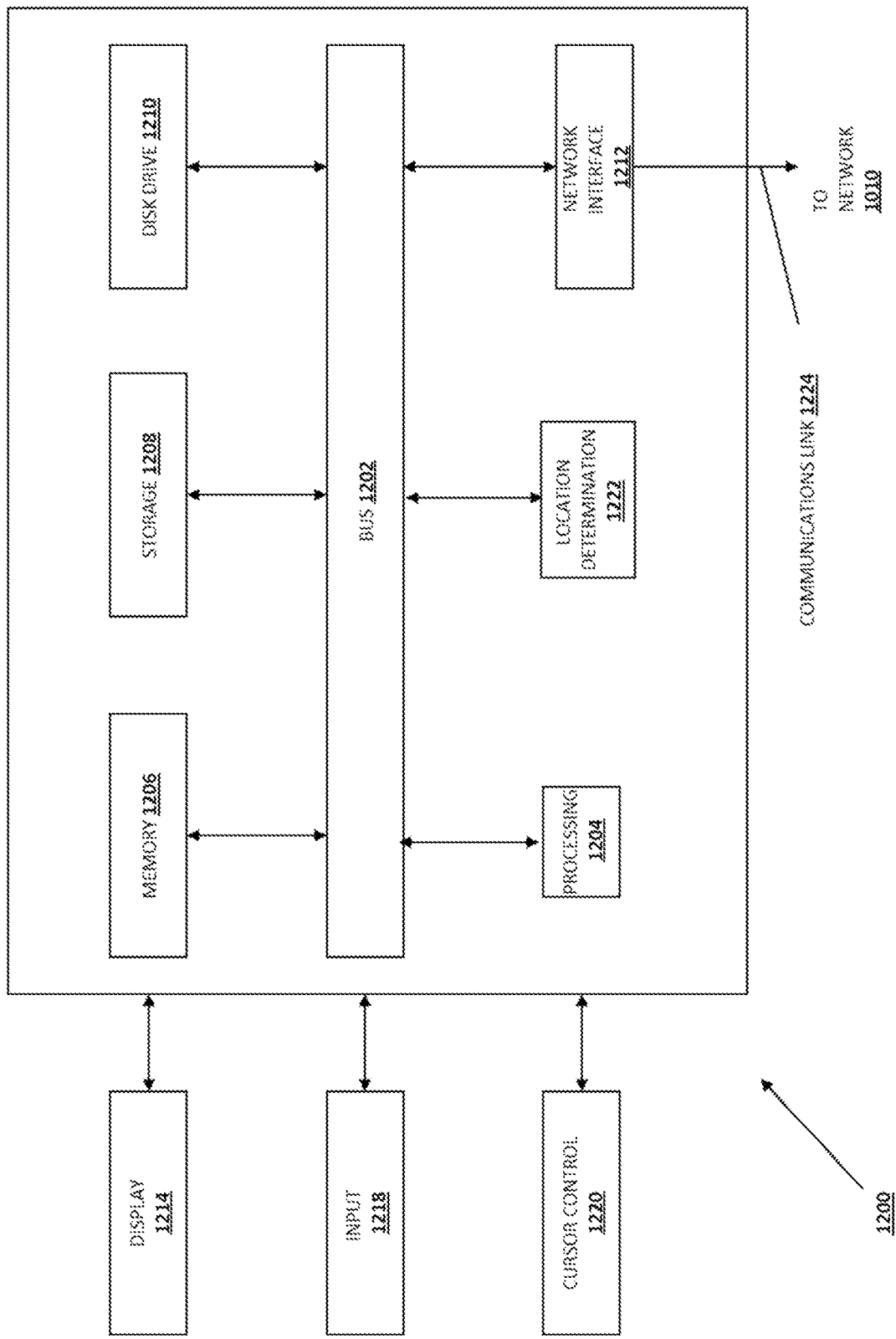
FIG. 12 is a schematic view illustrating an embodiment of a computer system.

Referring now to FIG. 12, an embodiment of a computer system 1200 suitable for implementing, for example, the system provider device 200, customer devices 400 and 500, service provider devices 1008, and/or social network service provider devices 1009, is illustrated. It should be appreciated that other devices utilized by users, persons, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the system provider device(s) 200, customer devices 400 and 500, the merchant devices 1004, the service provider device 1008, and/or the social network service provider devices 1009. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
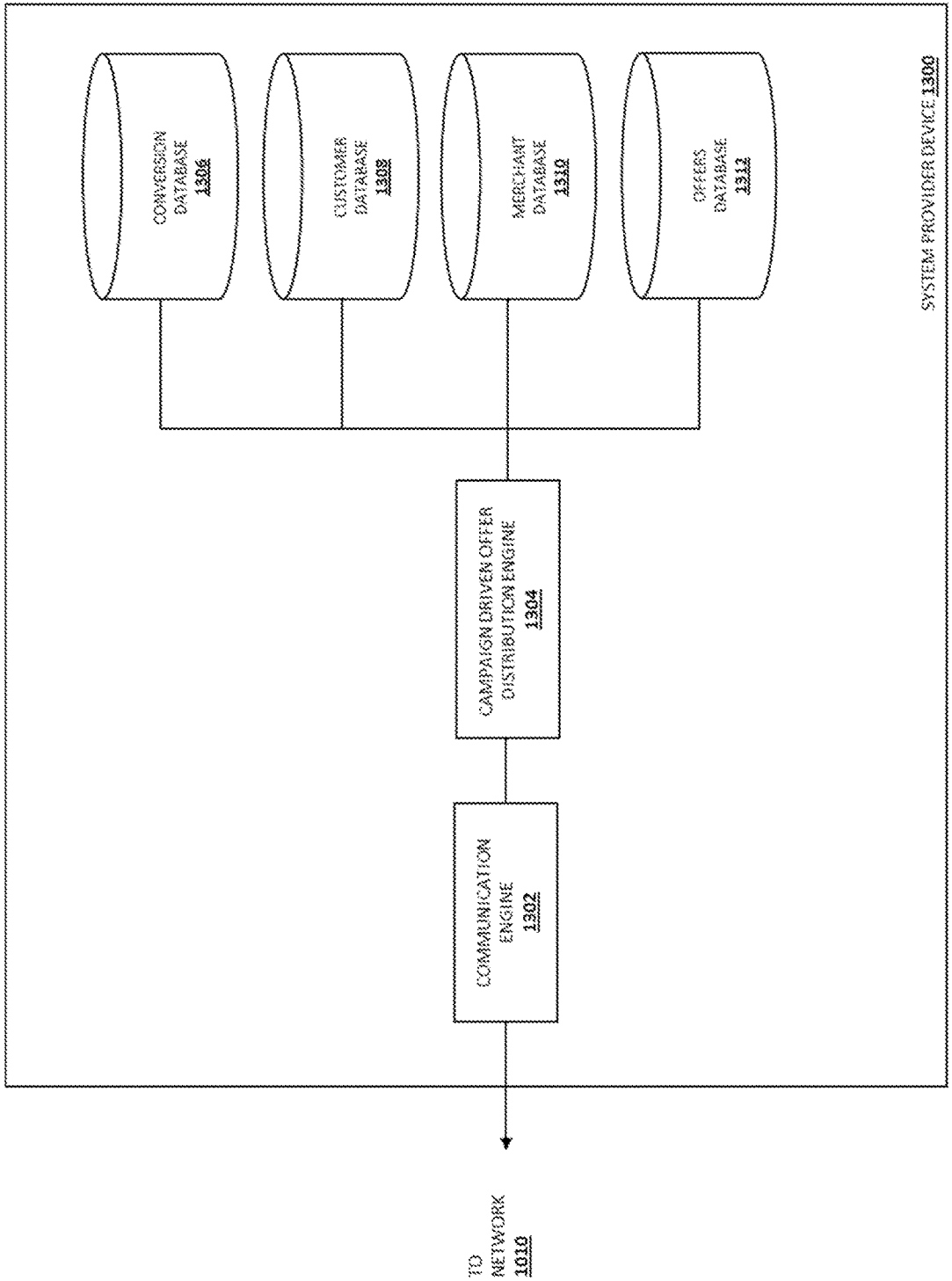
FIG. 13 is a schematic view illustrating an embodiment of a system provider device.

Referring now to FIG. 13, an embodiment of a system provider device 1300 is illustrated. In an embodiment, the system provider device 1300 may be the system provider devices 200 discussed above. The system provider device 1300 includes a communication engine 1302 that is coupled to the network 1010 and to a campaign driven offer distribution engine 1304 that is coupled to a conversation database 1306, a customer database 1308, a merchant database 1310, and an offers database 1312. The communication engine 1302 may be software or instructions stored on a computer-readable medium that allows the system provider device 1300 to send and receive information over the network 1010. The campaign driven offer distribution engine 1304 may be software or instructions stored on a computer-readable medium that is operable to generate a consolidated shopping cart using received item information associated with items of interest, store customer offer data in the databases, generate customer conversion profiles using the customer offer data and store the customer conversion profiles in the databases, retrieve financial information from the databases and determine purchase recommendations using the financial information, provide the notification to the customer, and provide any of the other functionality that is discussed above. While the databases 1306-1312 have been illustrated as separate from each other and located in the system provider device 1300, one of skill in the art will recognize that any or all of the databases 1306-1312 may be combined and/or may be connected to the campaign driven offer distribution engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer-implemented method, comprising:
    causing a graphical interface to display an offer to a user, wherein the graphical interface further displays a user-engagement mechanism that is disabled, wherein a disablement of the user-engagement mechanism indicates that a status of the offer is inaccessible;
    determining, after an initial display of the offer, that one or more conditions associated with the offer have been satisfied by the user;
    causing, by a computer system and based on the determining, the status of the offer to be changed from inaccessible to accessible for the user; and
    causing the graphical interface to re-display the offer to the user, wherein the re-display comprises the user-engagement mechanism being enabled by the computer system, thereby indicating that the status of the offer is accessible.

2. The computer-implemented method of claim 1, wherein subsequent to the causing the graphical interface to re-display the offer, the method further comprises:
    detecting user interaction with the enabled user-engagement mechanism; and
    directing the user to a website or an application associated with the offer to enable the user to redeem the offer.

3. The computer-implemented method of claim 1, wherein the causing the graphical interface to re-display the offer further comprises:
    causing the graphical interface to display a redemption code associated with the offer to enable the user to redeem the offer.

4. The computer-implemented method of claim 1, wherein the user-engagement mechanism includes a clickable virtual button having a first visual appearance when the offer is inaccessible and having a second visual appearance when the offer is accessible.

5. The computer-implemented method of claim 1, wherein the causing the graphical interface to display the offer to the user further comprises:
    causing the graphical interface to display information indicating that the offer will remain inaccessible to the user until the one or more conditions associated with the offer have been satisfied by the user.

6. The computer-implemented method of claim 1, wherein the offer is associated with a designated period of time, and wherein the one or more conditions associated with the offer need to be satisfied within the designated period of time to change the status of the offer for the user from inaccessible to accessible.

7. The computer-implemented method of claim 1, further comprising:
   identifying one or more additional offers based at least on the determination that the one or more conditions associated with the offer have been satisfied; and
   causing the graphical interface to display the one or more additional offers to the user.

8. The computer-implemented method of claim 1, wherein the offer is displayed to the user based on one or more user characteristics including previous product usage information by the user or an age range associated with the user.

9. The computer-implemented method of claim 1, wherein the offer is displayed to the user based on conversion data associated with the offer, wherein the offer is a first offer, and wherein the method further comprises:
   comparing a first conversion rate associated with the first offer to one or more other conversion rates associated with other offers; and
   determining, based on the comparing, that the first conversion rate associated with the first offer is higher than the one or more other conversion rates associated with the other offers.

10. A system comprising:
   a processor; and
   a non-transitory memory having stored thereon instructions that are executable by the processor to cause the system to perform operations comprising:
      causing, via a graphical interface, a first presentation of an offer to a user to be displayed, wherein the offer has a first status for the user during the first presentation, and wherein the first presentation includes an interactive user-engagement mechanism in a first state that reflects the first status of the offer;
      determining, after display of the first presentation of the offer, a satisfaction of one or more conditions associated with the offer by the user;
      switching, based on the determining the satisfaction of the one or more conditions, the first status of the offer to a second status for the user; and
      causing, via the graphical interface, a second presentation of the offer to the user to be displayed, wherein the interactive user-engagement mechanism is changed from the first state to a second state by the system during the second presentation to reflect the second status of the offer for the user.

11. The system of claim 10, wherein the offer is associated with a designated period of time, and wherein the one or more conditions associated with the offer need to be satisfied within the designated period of time to switch the first status of the offer to the second status for the user.

12. The system of claim 10, wherein the operations further comprise:
   identifying one or more additional offers based at least on the determination that the one or more conditions associated with the offer has been satisfied; and
   causing, via the graphical interface, the one or more additional offers to be displayed to the user.

13. The system of claim 10, wherein the offer is displayed to the user based on one or more user characteristics including previous product usage information by the user or an age range associated with the user.

14. The system of claim 10, wherein the offer is a first offer, and wherein the operations further comprise:
   comparing a first conversion rate associated with the first offer to one or more other conversion rates associated with other offers; and
   determining, based on the comparing, that the first conversion rate associated with the first offer is higher than the one or more other conversion rates associated with the other offers.

15. The system of claim 10, wherein subsequent to the causing, via the graphical interface, the second presentation of the offer to the user to be displayed, the operations further comprise:
   detecting user interaction with the interactive user-engagement mechanism; and
   directing the user to a website or an application associated with the offer to enable the user to redeem the offer.

16. The system of claim 10, wherein the causing, via the graphical interface, the second presentation of the offer to the user to be displayed further comprises:
   causing, via the graphical interface, a redemption code associated with the offer to be displayed to enable the user to redeem the offer.

17. A non-transitory machine-readable medium having instructions stored thereon that are executable by a processor to perform operations comprising:
   causing, via a graphical interface, an initial display of an offer along with a virtual mechanism to a user, wherein the offer has one or more conditions that are associated with an action performable by the user, and wherein the virtual mechanism has a first visual appearance that indicates that the offer is unavailable to the user until the action is performed by the user;
   determining a satisfaction of the one or more conditions based on detected activity of the user; and
   causing, via the graphical interface, a subsequent display of the offer along with the virtual mechanism, wherein the virtual mechanism has a second visual appearance that indicates that the offer is available now.

18. The non-transitory machine-readable medium of claim 17, wherein the offer is a first offer, and wherein the operations further comprise:
   comparing a first conversion rate associated with the first offer to one or more other conversion rates associated with other offers; and
   determining, based on the comparing, that the first conversion rate associated with the first offer is higher than the one or more other conversion rates associated with the other offers.

19. The non-transitory machine-readable medium of claim 17, wherein subsequent to the causing, via the graphical interface, the subsequent display of the offer along with the virtual mechanism, the operations further comprise:
   detecting user interaction with the virtual mechanism; and
   directing the user to a website or an application associated with the offer to enable the user to redeem the offer.

20. The non-transitory machine-readable medium of claim 17, wherein the causing, via the graphical interface, the subsequent display of the offer along with the virtual mechanism further comprises:
   causing, via the graphical interface, a redemption code associated with the offer to be displayed to enable the user to redeem the offer.

* * * * *